(12) United States Patent
Jacoway

(10) Patent No.: US 6,913,245 B2
(45) Date of Patent: Jul. 5, 2005

(54) IN-LINE SHUT-OFF VALVE AND METHOD OF ASSEMBLING SAME

(76) Inventor: Michael G. Jacoway, 1505 Mother Goose Trail, Lookout Mountain, GA (US) 30750

( * ) Notice: Subject to any disclaimer, the term of this patent is extended or adjusted under 35 U.S.C. 154(b) by 308 days.

(21) Appl. No.: 10/197,980

(22) Filed: Jul. 18, 2002

(65) Prior Publication Data

US 2004/0011397 A1 Jan. 22, 2004

(51) Int. Cl.[7] .............................................. F16K 31/44
(52) U.S. Cl. ...................................... 251/345; 251/352
(58) Field of Search ................................ 251/341, 345, 251/349, 351, 352, 354; 222/549, 552, 553

(56) References Cited

U.S. PATENT DOCUMENTS

| 453,109 | A | * | 5/1891 | Dreisorner | 251/344 |
|---|---|---|---|---|---|
| 624,422 | A | * | 5/1899 | Baird | 251/149.8 |
| 2,682,358 | A | * | 6/1954 | Vitale | 222/553 |
| 3,317,093 | A | * | 5/1967 | Moran | 222/549 |
| 3,426,797 | A | | 2/1969 | Baker | |
| 3,760,836 | A | | 9/1973 | Albanese | |
| 3,985,152 | A | | 10/1976 | Albanese | |
| 4,004,775 | A | * | 1/1977 | Jones et al. | 251/345 |
| 4,055,179 | A | * | 10/1977 | Manschot et al. | 251/352 |
| 4,603,837 | A | * | 8/1986 | Steer | 251/352 |
| 4,842,012 | A | * | 6/1989 | Sheen | 251/345 |
| 4,848,403 | A | | 7/1989 | Pilolla et al. | |
| 5,088,689 | A | | 2/1992 | Hendricks et al. | |
| 5,135,140 | A | * | 8/1992 | Maguire et al. | 251/352 |
| 5,332,194 | A | * | 7/1994 | Austin et al. | 251/345 |
| 5,595,212 | A | | 1/1997 | Warshawsky et al. | |
| 5,755,247 | A | | 5/1998 | Condon | |
| 5,782,455 | A | * | 7/1998 | Burnworth | 251/345 |
| 6,086,570 | A | | 7/2000 | Aboul-Hosn et al. | |
| 6,105,932 | A | | 8/2000 | Crook | |
| 6,273,132 | B1 | | 8/2001 | Chrysler et al. | |

OTHER PUBLICATIONS

Examples of retaining rings, www.springmasters.com (admitted prior art).

* cited by examiner

Primary Examiner—Paul J. Hirsch

(57) ABSTRACT

An in-line water shut-off valve is provided including a tailpipe which is attached to a main water line in order to form a "T" or 90° "L" which protrudes from the wall of the building and upon which is attached a cap which is threadably and rotatably attached and includes a plug therein so that upon rotation into a closed position, the plug will block the through flow bore of the tailpipe. After the installation of fixtures, the water supply line of the fixture may be threadingly attached to an outlet of the cap and the cap rotated 180 degrees to open the valve in order to allow for the flow of water; without the need of cutting off and replacing caps, soldering additional caps or valves or turning off the main water supply.

15 Claims, 4 Drawing Sheets

IN-LINE SHUT-OFF VALVE AND METHOD OF ASSEMBLING SAME

The present invention pertains to an in-line shut-off valve and in particular a rotatable valve assembly providing a shut-off valve for a main water line.

BACKGROUND

Currently water stop valves are being used in the plumbing industry that have an "L" shaped device with a turn valve at the end. The turn valve has an axis of rotation that is perpendicular to the longitudinal axis of the pipe to which it is attached. This stop valve is not installed until after the cabinets and vanities or other fixtures have been installed—during the trim out. When new construction is involved, the normal course of events are as follows: After the building is framed and in the dry, the plumber is called in to install the copper water pipes and drains—"rough-in." The plumber Ts off the main three-quarter inch water lines that are placed in the walls and basement/crawl space with half-inch copper Ts or Ls (the half-inch pipe and main three-quarter inch water line form a "T" shaped assembly or a 90° copper "L" shaped assembly) every place where a toilet, sink, ice maker, washing machine and or other fixtures requiring water will be placed. The plumber stubs out the half-inch copper pipe about two inches from the stud wall at every T and solders a half-inch copper end piece. The plumber then does a pressure check on the whole system and waits to be called back to finish the project. When the plumber is called back to finish, after all the sheet rock has been hung and kitchen cabinets and bathroom vanities have been installed, the plumber shuts off the water for the entire building and drains the pipes. The plumber will then go to each T and cut the end piece off. He has to make sure the copper is completely dry to receive the solder that will hold the "L" shaped water shut-off valve in place. The plumber then solders the "L" shaped water shut-off valves in place. These "L" shaped valves are not installed during the rough-in due to their size and configuration. The sheetrock, cabinet and vanity installers would have to cut a large hole in the back of their sheetrock and cabinets to accommodate the "L" shaped valves. This is inconvenient and is not esthetically pleasing for the sheetrock, cabinets or vanities to have such large holes, so the "L" shaped valve is added after installation of the fixtures. The water for the building is then cut on and again pressure checked for leaks.

Therefore, it is understood that under the current system, a plumber must make multiple trips to the construction site during the construction of the building and installation of the "L" shaped valves requiring multiple time consuming labor and steps including the removal of the end piece and checking of the pressurized system and turning the main water supply on and off multiple times. A valve assembly and water shut-off valve and system of assembly therefor that would eliminate such protracted installation steps would save time and expense and would be desirable.

SUMMARY OF THE INVENTION

The present invention provides an in-line shut-off valve comprising a tailpipe including a generally cylindrical end having a longitudinal axis and an opening. A generally cylindrical cap is provided, having an attachment end an outlet end a rotational axis co-linear with the longitudinal axis of the tail pipe. The attachment end of the cylindrical cap is attached to the threaded end of the tailpipe. A plug is formed within the cylindrical cap so that upon rotation of the cap around the rotational axis, the plug may be rotated between a first position blocking the opening of the tailpipe and a second position at least partly clear of the opening to allow the flow of water therethrough and to the outlet of the cap. In an embodiment, the plug fills approximately one-half of the inner area of the cap at its outlet end forming a top portion of the cap. In an embodiment, the cap includes an outlet that is cylindrically shaped and protrudes from an end of the cap opposite the attachment end and at a bottom portion of the cap, adjacent the top portion. In an embodiment, the outlet includes a terminal end that is externally threaded. In an embodiment, the attachment end of the cap has an inner bore including inner threading for receiving the threaded end of the tailpipe.

In an embodiment, the tailpipe may include an attachment portion for attaching the tailpipe to a main water-line to form a T-shaped or 90° L-shaped assembly at a location where a fixture is to be attached. In an embodiment, the tailpipe may include a securement member adjacent the threaded end and for being received in an aperture at the attachment end of the cap when the cap is rotated to the second position. In an embodiment, the securement member may be a snap-ring that maintains the attachment of the cap to the tailpipe while allowing the cap to rotate between the first and second positions and/or a spring-loaded lock-post received in an aperture in the cap in order to restrict rotation of the cap and provide visual indication the cap is locked. In an embodiment, a pair of securement members and a pair of corresponding apertures are provided on the cap. In an embodiment, the longitudinal axis does not bisect an inner bore of the tailpipe.

The invention may further provide an in-line valve comprising a tailpipe having a first end having an opening and a longitudinal axis. A cap is provided, having an attachment end rotatably attached to the first end of the tailpipe and the cap has a rotational axis collinear with the longitudinal axis. A plug is formed in the cap so that upon rotation of the cap around the rotational axis the plug may block the opening and prevent the flow of fluid therethrough. In an embodiment, the cap is threadably mounted to the first end of the tailpipe so that the cap is in a first position when the plug is blocking the opening and the cap may be rotated approximately 180 degrees to a second position so that the opening is at least partly clear and the fluid may flow through the cap and exit an outlet of the cap.

The invention provides a method for quickly and easily assembling a water distribution system and attaching fixtures thereto without post installation of water shut-off valves, removal of blocking end caps or turning a main water supply on and off numerous times, the assembly comprising the steps of forming a T-shaped or 90° L-shaped assembly at a main water line by attaching a tailpipe thereto; enclosing the main water line with an interior wall having a hole through which an open end of the tailpipe protrudes and rotating the cap to a first position so that a plug within the cap encloses the opening so that water cannot escape through an outlet on the cap; activating the main water supply a final time so that the main water line is pressurized; installing a fixture at a location adjacent the hole in the interior wall; attaching a water supply line from the fixture to the outlet of the cap; and rotating the cap to a second position so that water may flow therethrough to the water supply line of the fixture.

In an embodiment, the tailpipe open end may include a longitudinal axis being co-linear with a rotational axis of the cap when it is attached to the tailpipe. In an embodiment, the method may further comprise the step of rotating the cap 180 degrees from the first position so that a securement member protrudes through an aperture of the cap in order to secure the cap in the second position.

In an embodiment, the method may comprise the step of sweating the tailpipe to the main waterline. In an embodiment, the water supply line may be threadingly attached to a threaded end of the outlet protruding from an end of the cap. In an embodiment, the plug may be semi-circular shaped and fill approximately one-half of the interior space of a middle section of the cap that is abutting and adjacent the open end of the tailpipe, when the cap is threaded onto the tailpipe.

BRIEF DESCRIPTION OF THE DRAWINGS

For the purpose of facilitating an understanding of the subject matter sought to be protected, there are illustrated in the accompanying drawings and embodiments thereof, from an inspection of which, when considered in connection with the following description, the subject matter sought to be protected, its construction and operation, and many of its advantages should be readily understood and appreciated.

FIG. 3a is a cut-away view of FIG. 3 taken at line 3a—3a;

FIG. 4a is a cut-away view of FIG. 4 taken at line 4a—4a;

DETAILED DESCRIPTION OF A PRESENTLY PREFERRED EMBODIMENT

Figure 1:
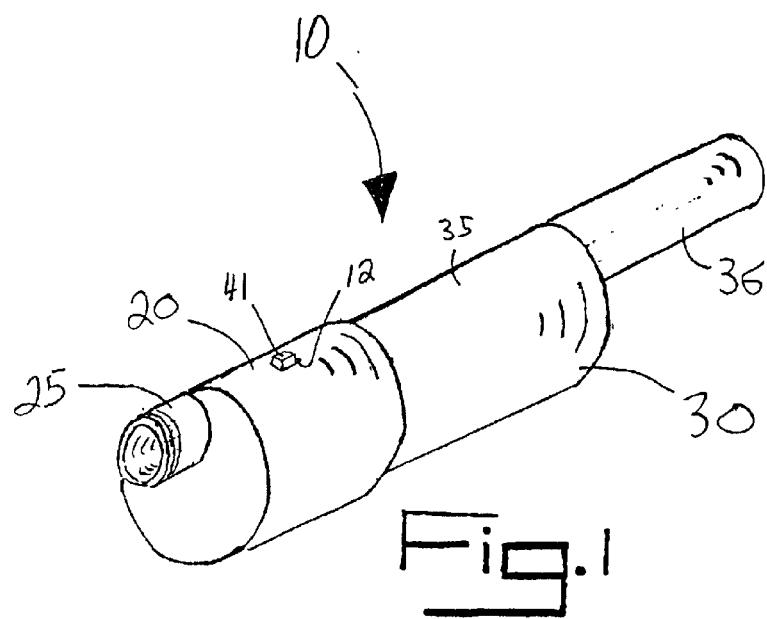
FIG. 1 is a perspective view of the inline shut-off valve of the present invention.

The present invention is explained by example with reference to FIGS. 1–6 which show a presently preferred embodiment of the invention. FIG. 1 is a perspective view of an in-line water shut-off valve 10 comprising a cap 20 having an outlet 25. The cap 20 in the presently preferred embodiment is threadedly attached to a tailpipe 30, which includes a main body portion 35 and an attachment portion 36 for connecting the tailpipe to a main water line. The in-line water shut-off valve 10 is shown in FIG. 1 in an "open" position, as will be discussed in more detail below, so that fluid may flow from outlet 25. In its "open" position a securement member 41 of the tailpipe 30 protrudes through aperture 12 provided in the cap 20.

Figure 2:
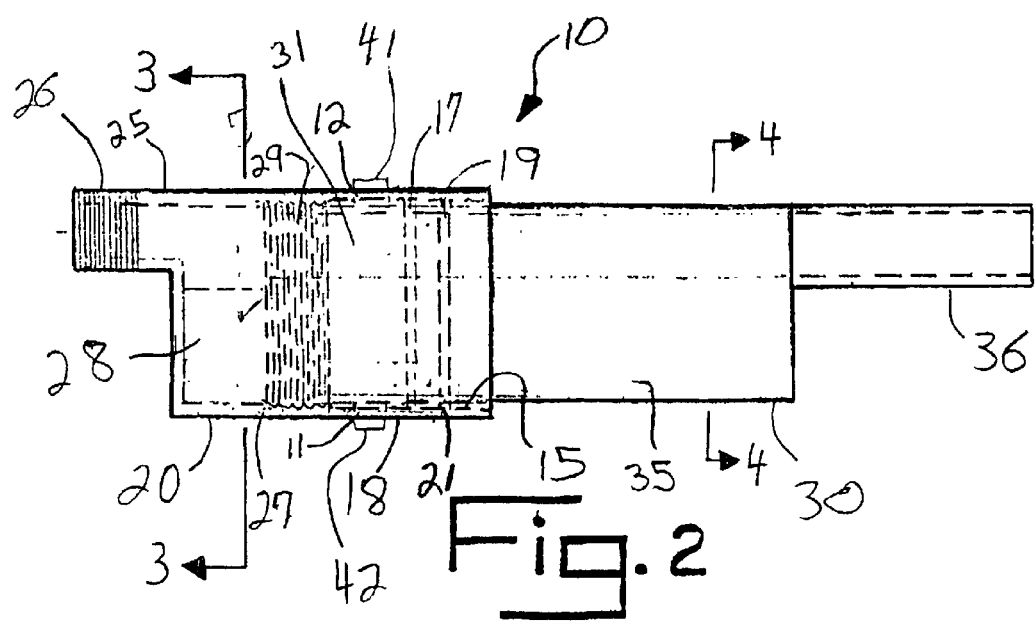
FIG. 2 is an enlarged side elevation view of the in-line shut-off valve of FIG. 1.

Referring to FIG. 2, the outlet 25 of the in-line water shut-off valve 10 has a threaded end 26. The interior of the cap 20 includes a middle segment 27 which includes a plug 28 and inner threads 29. The cap 20 further includes an end segment 18 which forms an inner bore 15. The inner bore 15 receives an attachment end 31 of the main body 35 of the tailpipe 30. The tailpipe 30 is attached to the cap 20 so that the attachment end 31 is inserted within the bore 15 and is threadedly engaged therein so that threads on the attachment end 31 engage threads 29 of the cap 20. In a preferred embodiment the attachment portion 36 is copper and attaches to a "T" or 90° "L" in main water line. The cap 20 and tailpipe 30 are formed of a polymer material such as PVC or any material that would not leak and could handle water pressure. In an alternate embodiment, the cap 20 and the tailpipe 30 may be formed of copper. However, any rigid material which meets applicable plumbing codes, including other metals or polymers may be used to form the inline water shut-off valve 10. In an alternate embodiment a sealing ring or resilient O-ring 17 may be provided within the in-line shut-off valve 10, such as between the attachment end 31 of the tailpipe and the end of the inner bore 15 of the cap 20. For example, a groove may be lathed within the interior of the cap 20 to receive a square cross section Buna-N O-ring that provides a leak-proof seal. Adjacent the O-ring 17 is a snap-ring 19 that acts as a securement member to lock and retain the cap 20 to the tailpipe 30 by engaging a lathe cut groove 21. A second securement member is also provided at the attachment end 31 of the tailpipe 30. In an embodiment, securement members 41, 42 are received in apertures 11, 12 of the cap 20. In a preferred embodiment the securement members 41, 42 are spring-loaded lock-posts. In a preferred embodiment the securement members 41, 42 are located 180° from the other securement member 41, 42 or aperture 11, 12, respectively.

Figure 3:
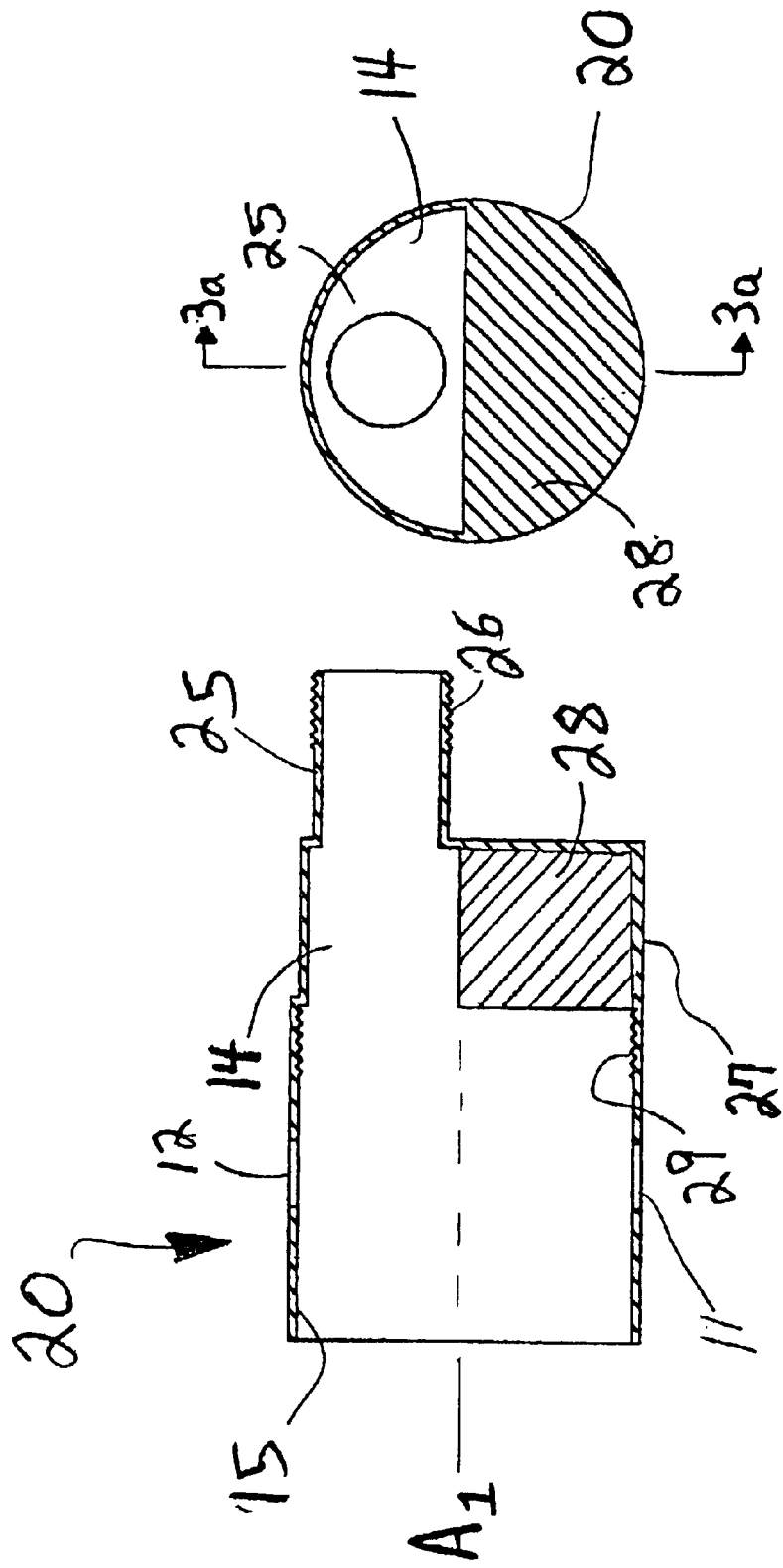
FIG. 3 is a cut-away view of the cap of the inline shut-off valve of FIG. 2, taken at line 3—3.

Referring to FIGS. 3 and 3a, the cap 20 includes a middle segment 27 which include a plug 28 and below the plug 28 is an intermediate bore 14 that communicates between the outlet 25 and the inner bore 15. The plug 28 may be formed of rubber and may be adhesively secured within the cap 20. Alternatively, the plug 28 may be formed as one-piece with the cap 20. The inner bore 15 includes threaded portion 29 which is adjacent the middle section 27. It may be understood that the inner bore 15 receives the attachment end 31 of the tailpipe 30, which may be slid in a linear fashion through the bore 15 until the threaded end of the attachment end 31 of the tailpipe 30 reaches the threads 29 of the cap 20. Upon abutment of the first threads of the attachment end 31 of the tailpipe 30 to the first threads 29, further insertion of the tailpipe is accomplished by rotation of the cap 20 so that the inner bore 15 of the cap 20 threadedly engages threads 38 of the tailpipe 30. In a preferred embodiment, the cap 20 includes apertures 11 and 12, which will be explained in further detail below. The cap 20 has a rotational axis A1, upon which the cap rotates when the threads 29 engage the attachment end 31 of the tailpipe 30.

Figure 4:
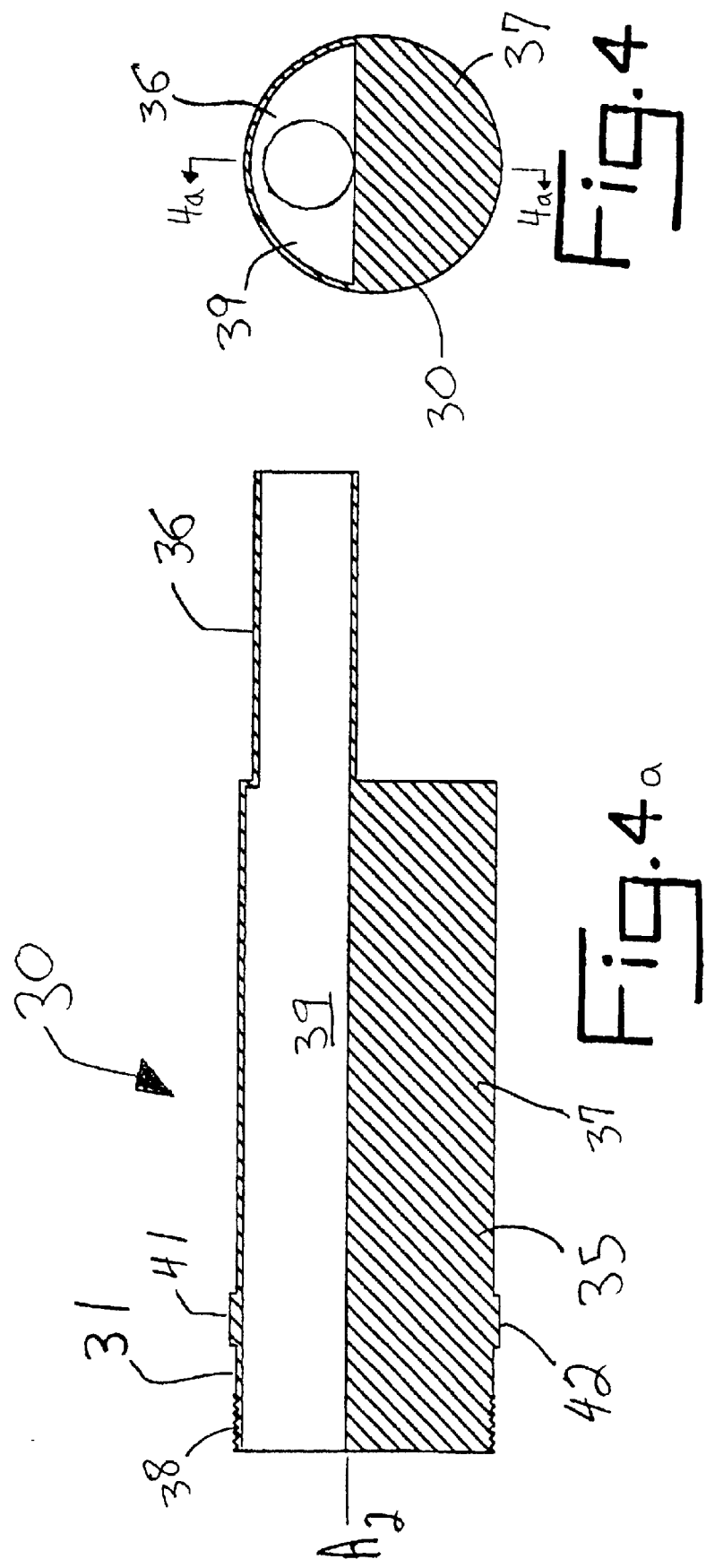
FIG. 4 is a cut-away view of the tailpipe of FIG. 2 taken at line 4—4.

Turning to FIGS. 4 and 4a, the tailpipe 30 is shown having the main body portion 35 having attachment end 31 including external threads 38. Opposite the attachment end 31 is an attachment portion 36. In an embodiment, the tailpipe 30 includes a through-flow bore 39 that is machined out of the pipe leaving a blocked area 37. This arrangement where the through-flow bore 39 forms the upper half of the tailpipe 30 and is substantially coaxial with the T-attachment 36, will help the fluid to flow unobstructed through the tailpipe 30. However, in an alternate embodiment the blocked area 37 may be hollowed out in communication with through-flow bore 39. The attachment end 31 has a longitudinal axis A2, which is located at the radial center of the threaded portion at the attachment end 31 of the tailpipe 30. Axis A2 is collinear with axis A1 when the cap 20 is mounted to the tailpipe 30. In the preferred embodiment, axis A2 is not the longitudinal axis of the through-flow bore 39. The tailpipe includes securement members 41, 42 which protrude beyond the outer diameter of the tailpipe 30. The securement members 41, 42 engage in apertures 11, 12 of the cap 20, as will be explained in further detail below.

Figure 5:
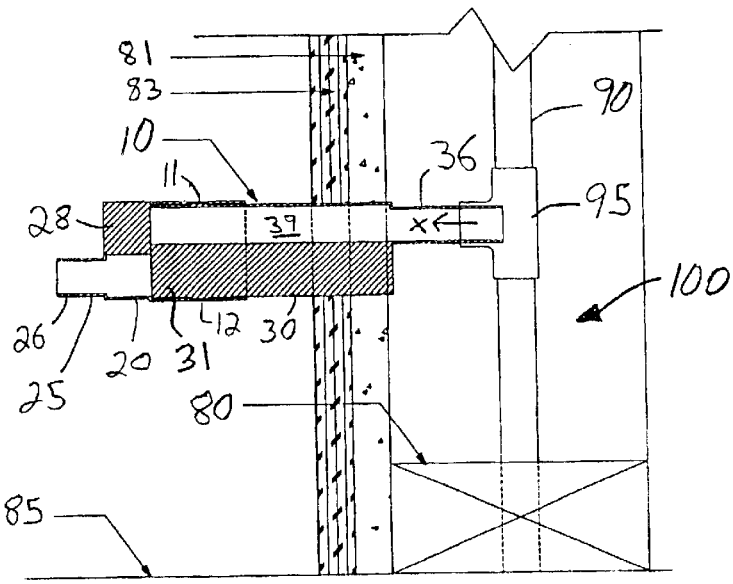
FIG. 5 is a longitudinal sectional view of an inline shut-off valve in its closed position assembled to a water distribution system.

FIG. 5 is a depiction of the in-line water shut off valve 10 of the present invention installed to a water distribution system 100 of a building. The water distribution system 100 may include a main water line 90 which is provided within a standard stud wall 80. The main water line 90 will be understood to one of skill in the art to be attached to other main water lines throughout a structure, such as a building, and converge at a main water service inlet valve which feeds water to the structure from a metropolitan water line. For example, in a building or apartment the main water line 90 is a 1¾" pipe which feeds the entire structure or building or other type of building. The main water line 90 may run up through a floor 85 of a second story of a building, or may run through a basement floor or crawl space 85 as well.

The main water line 90 is constructed, including a T-joint 95 or 90° L formed at a location where a fixture such as a toilet, sink, commode, radiator, garden faucet, laboratory stop valve, ice-maker, washing machine and associated cabinets or vanities will be installed. The T-attachment end 36 of the tailpipe 30 is attached to the T-joint 95 or 90° L-shaped joint. In an embodiment, the attachment end 36 is sweated on the joint 95 using traditional means, such as solder to a dry end opening of the joint 95. The cap 20 is then attached to the tailpipe 30 by sliding bore 15 over the attachment end 31 of the tailpipe 30 until the threads 38 of the attachment end 31 abut against the threads 29 of the cap 20. The cap 20 is then threadedly and rotatably attached onto the tailpipe 30. The tailpipe 30 and cap 20 are precision manufactured in a preferred embodiment having fine threads so that the cap 20 may be rotated by hand to a mated position where the threads of the cap 20 and the attachment end 31 are mated via finger tightening so that a securement member such as a snap ring 19 on the tailpipe may expand and engage a groove 21 of the cap 20 (see FIG. 2). In a preferred embodiment, the snap-ring 19 engages the groove 21 before the cap 20 is completely threaded on the tailpipe 30 e.g. at least a ½ turn remains to complete the threading of the cap 20 to the tailpipe 30. In a preferred embodiment the securement members 41, 42 are precision formed so that they will only be aligned with and protrude through apertures 11, 12 when the cap 20 is completely threaded on the tailpipe 30. In the position depicted in FIG. 5, the cap 20 is ½ a turn shy of being completely threaded onto tailpipe 30 and the securement members 41, 42 do not protrude through apertures 11, 12 and do not restrict further rotation of the cap 20. In such a first position, the plug 28 is oriented at a top portion of the cap end 20 which blocks the through-flow bore 39 of the tailpipe 30.

In an alternate embodiment, the plug 28 does not require securement members 19, 21, 41 or 42 to be present to position the valve 10 in a manner to block the through-flow bore 39 of the tailpipe 30 or to indicate that such shut-off or turn-on has occurred. In such an alternate embodiment, a visual indicia such as a marking on the outside of the cap 20 that states "open" or "closed" depending on its position on the cap, can indicate where the plug 28 is located within the inside of the cap 20 so that alignment of the plug 28 to block the through flow bore 39 can be identified. In such an embodiment, the cap 20 is threadedly assembled by hand onto the attachment end 31 of the tailpipe 30 until further rotation is not possible. The cap is then loosened slightly (counter clockwise rotation) until the outside indicia indicate that the valve is "closed" and the plug 28 is aligned to block the through-flow bore 39. Such loosening, approximately ½ a turn or less counter-clockwise, will still provide a sealproof enclosure of the plug 28 against the opening of the through-flow bore 39 (which will stop the flow of water therethrough), because the plug 28 in a preferred embodiment is resilient and provides for sealing against the end of the tailpipe under a range of compressions between the final two turns of the cap 20. In a further alternate embodiment, loosening does not back-off the plug 28 from the end of the tailpipe 30 and the snap-ring 19 and spring-loaded lockposts 41, 42 are still in place and the cap 30 rotates 180° so that the posts 41, 42 snap into place at 12 and 6 o'clock positions (e.g. the posts 41, 42 switch holes 11, 12). For example, with reference to FIG. 1, upon loosening of the cap 30 in order to move it to a second/open position, the post 41 will recess and move out of aperture 12 from the 12 o'clock position and rotate 180° to the 6 o'clock position to be received in aperture 11 and simultaneously post 42 will move from the 6 o'clock position to the 12 o'clock position and engage aperture 12.

Therefore, according to these assembly steps, a "T" or 90° "L" is formed at the desired location along the main water line 90 and provides a closed system and will allow the water distribution system 10 to be pressurized. Following installation of the in-line shut-off valve 10 the plumber will turn on the main water valve for the building and check the system for leaks. In certain situations, the plumber need not return to the construction site again, as the remaining steps of activating the in-line shut-off valve 10 is very simple and does not require any sweating or soldering or complicated additional pipes to be added in order to install the fixtures.

Figure 6:
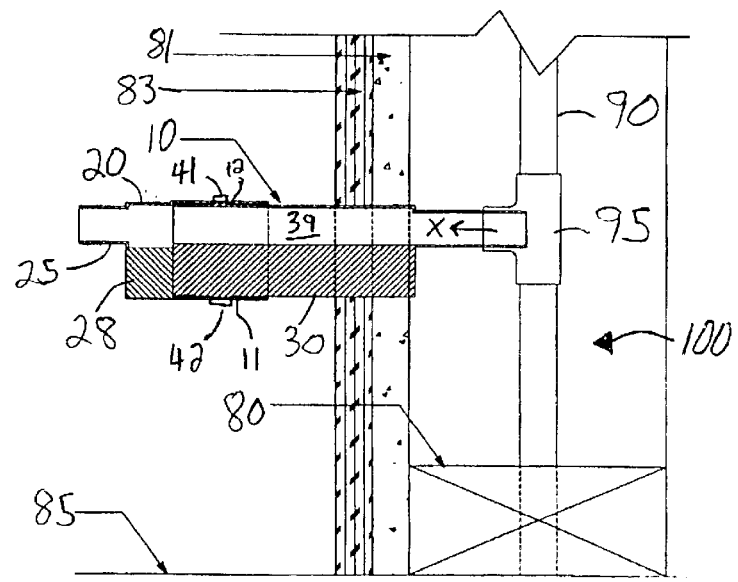
FIG. 6 is a view similar to FIG. 5 with the valve in its open position.

After the in-line shut-of valve 10 is attached, the final construction of the inner portions of the building may proceed, including the attachment of walls, including sheet rock 81 and in some embodiments a cabinet 83 attached to the sheet rock 81. In a preferred embodiment, the maximum diameter of the attachment end 31 of the tailpipe 30 is approximately 1–1½ inch, for example, 1⅜ inch. Therefore, upon installation of the walls such as sheet rock 81 and cabinets 83, a 1–1½ inch hole is made through those surfaces in order so that the tailpipe 30 may protrude therethrough. The fixtures may then be assembled in the location where the inline shut-off valve 10 has been installed. For example, if a sink in a bathroom is to be installed, it can be placed on the cabinet 83 and the mounting brackets installed and the sink placed in its proper location with the faucet attached thereto. A water supply line such as a flexible ⅜ inch tubing may be attached to the faucet and extend downward toward the location of the in-line water shut-off valve 10. In a preferred embodiment, the outlet 25 is ⅜ inch diameter for interior applications. However, in alternate embodiments, the outlet 25 may be ½–⅝ inch diameter or a larger adapter may be added. For example, for exterior applications, such as for a garden hose a larger diameter outlet 25 such as a ½–⅝ inch diameter outlet may be provided. The water supply line (not shown) from the faucet may include a threaded collar. The threaded collar (not shown by) is of standard size and may attach to the threaded end 26 (See FIG. 3) of the outlet 25 of the cap 20 protruding from the wall, on the in-line water valve 10. The water supply line is attached to the outlet 25 and the cap 10 is then rotated 180 degrees to a second position as shown in FIG. 6. In an alternate embodiment the plug 28 may be reconfigured so that rotation of less than 180° may "open" or "close" the valve 10.

Turning to FIG. 6, it can be seen that the outlet 25 is oriented at the top half of the inline shut-off valve 10 and is aligned with the through flow bore 39 so that water may flow freely in the direction of arrow X from the main water line 90 through the through flow bore 39 of the tailpipe 30 and into the cap 20 and out through outlet 25 which will have a water supply line (not shown) attached thereto. Since the water supply line to a fixture in most embodiments is a flexible tube, the rotation of the cap 20 180 degrees will be easily accomplished and not require the distortion of the water supply line and should not crease the water supply line in a manner which would impede the flow of water therethrough. Upon rotation of the cap 20 into the second position as shown in FIG. 6, which is an "open" position, the plug 28 has been moved away from the through flow bore 39 and the securement members 41, 42 protrude through apertures 11, 12 and help to retain the cap 20 in its "open" position. In a preferred embodiment, the securement members 41, 42 are spring-loaded locking posts that upon achieving orientation within the apertures 11, 12 which is unobstructed, will pop-up through the apertures 11, 12 and lock the cap 20 in its "open" position, or second position.

In an alternate embodiment the lock posts 41, 42 and corresponding apertures 11, 12 may be located on the other side of the snap-ring 19 and groove 21 adjacent the end of the cap 20. In a preferred embodiment, the cap 20 achieves its "open" position upon rotation of the cap to its furthest tightened or clockwise position by hand tightening or by using a tool such as a wrench. In this way, the cap 20 will only have apertures 11, 12 aligned with securement members 41, 42 upon its fullest tightened position and the securement members 41, 42 will only protrude through the apertures 11, 12 upon this last step of rotating the cap 20 to its "open" position when the fixture is attached thereto via a water supply line to the outlet 25. Therefore, the locking posts 41, 42 also provide a visual indication that the valve 10 is "open" when they protrude through and appear in the apertures 11, 12. This visual indicia is in addition to the visual indication that the valve 10 is "open" provided by the outlet 25 and the T-attachment 36 being aligned at the upper part, or twelve o'clock position as shown in the preferred embodiment of FIG. 1. In some cases the T-attachment 36 may be behind a wall and not visible, so that positioning of the outlet 25 of the cap 20 in the twelve o'clock position may not, in and of itself, indicate to an installer that the valve 10 is "open," because the alignment of the outlet 25 with the T-attachment 36 cannot be visually confirmed. In some cases, if the valve 10 is installed with the tailpipe rotated (other than shown in FIG. 1) the visibility of the securement members 41, 42 may be the best indication the valve 10 is "open."

However, since the securement members 41, 42 in a preferred embodiment are spring loaded, they may also be recessed below the apertures 11, 12 so that the cap 20 may be re-oriented and rotated from its "open" or "closed" position. In a preferred embodiment, the securement members 41, 42 have a spring pressure that allows for the depression of the securement members 41, 42 via fingertip depression. In an alternate embodiment, a special tool may be used in order to engage the securement members 41, 42 in cases where tampering with the cap 20 may be desired to be prevented by the hands or fingers of unauthorized persons. Such depression of the securement members may be restricted to those only with a special tool. However, the rotation of the cap 20 between the "open" and "closed" position that is re-enabled by depressing the securement members 41, 42 still does not allow the cap 20 to be removed from the end of the tailpipe 30 because the other securement member, such as snap-ring 19, continues to engage the groove 21 and secure the cap 20 on the end of the tailpipe 30. Therefore, it may be understood that the final operation of attaching a water supply line to the outlet 25 of the in-line water valve 10 may be accomplished quickly and easily without having to turn-off the entire water distribution system or re-sweat or solder additional pieces, or cut off an end piece from the T or L (90°). It may also be understood that the present invention may provide a valve system for fluids other than water and may be used in locations wherever a shut-off for a fluid distribution system is desired.

The matter set forth in the foregoing description and accompanying drawings is offered by way of illustration and not as a limitation. While particular embodiments have been shown and described, it will be obvious to those skilled in the art that changes and modifications may be without departing from the broader aspects of applicant's contribution. The actual scope of the protection sought is intended to be defined in the following claims when viewed in their proper perspective based on the prior art.

What is claimed is:

1. An in-line shut-off valve comprising:
   a tailpipe including a generally cylindrical portion having a longitudinal passageway extending there through and spans a portion of the inner diameter area of the tailpipe, the remaining inner diameter area being blocked along substantially the entire length of the cylindrical portion
   a generally cylindrical cap having an attachment end, an outlet end and a rotational axis collinear with the longitudinal passageway of the tailpipe the attachment end attached to a threaded end of the tailpipe; and
   a plug formed with the cylindrical cap, the plug fills a portion of the inner area of the cap substantially having the same diameter area as that of the tailpipe blocked area at its outlet so that upon rotation of the cap around the rotational axis the plug may be rotated between a first position blocking the passageway of the tailpipe when in alignment with the tailpipe blocked area and a second position at least partially opening the passageway of the tailpipe and cylindrical cap to allow the flow of water there through and the end of the cap when the tailpipe passageway and the cylindrical passageway are in alignment with one another.

2. The in-line water shut-off valve of claim 1 wherein the cap includes an outlet, that is cylindrically shaped and protrudes from an end of the cap opposite the attachment end and at the bottom portion of the cap, adjacent the top portion.

3. The in-line water shut-off valve of claim 2 wherein the outlet includes a terminal end that is externally threaded.

4. The in-line water shut-off valve of claim 1 wherein the attachment end of the cap has an inner bore including threading for receiving the threaded end of the tailpipe.

5. The in-line water shut-off valve of claim 1 wherein the tailpipe includes a securement member adjacent the threaded end for securing the cap when the cap is attached to the threaded end of the tailpipe.

6. The in-line water shut-off valve of claim 5 wherein the securement member is a snap-ring that maintains the cap attachment to the tailpipe while allowing the cap to rotate between the first and second positions.

7. The in-line water shut-off valve of claim 5 wherein securement member is a spring loaded lock post received in an aperture provided in the cap in order to restrict rotation of the cap.

8. The in-line water shut-off valve of claim 1 wherein a longitudinal axis of said tailpipe is not collinear to the inner passageway of the tailpipe.

9. The in-line water shut-off of claim 1 comprising internal threads of the cap threadably mounted to the first end of the tailpipe so that the cap a is secured and rotated to the first position and the cap may be rotated approximately 180 degrees to the second position.

10. The in-line water shut-off valve of claim 1 including a securement member to secure the cap to the tailpipe.

11. The in-line water shut-off valve of claim 10 wherein the securement member is a locking post of the tailpipe protruding through an aperture in the cap in order to secure the cap in the second position.

12. A method of quickly and easily assembling a water distribution system and attaching fixtures thereto without post installation of water shut-off valves, re-sweating blocking end caps or turning a main water supply on and off numerous times, the assembly comprising the steps of:

forming a T-shaped or L-shaped assembly at a main water line by attaching a tailpipe assembly thereto;

providing the tailpipe assembly with a generally cylindrical portion having a longitudinal passageway extending through and spans a portion of the inner diameter area of the tailpipe, the remaining inner diameter area being blocked along substantially the entire length of the cylindrical portion, providing a generally cylindrical cap having an attachment end, an outlet end and a rotational axis collinear with the longitudinal passageway of the tailpipe the attachment end attached to the threaded end of the tailpipe, the cylindrical cap having a plug that fills a portion of the inner area of the cap at its outlet, rotating the cap about the tailpipe to a first position so that the plug within the cap blocks the passageway of the cylindrical cap and the tailpipe so that water cannot escape through the outlet end of the cap;

enclosing the main water line with an interior wall having a hole through which the cap protrudes;

installing a fixture at a location adjacent the hole in the interior wall;

attaching a water supply line from the fixture to the outlet of the cap; and rotating the cap about the tailpipe to a second position communicating the passageway of the tailpipe and the passageway of the cap so that water may flow therethrough to the water supply line of the fixture.

13. The method of claim 12 wherein the tailpipe open end has a longitudinal axis that is collinear with a rotational axis of the cap when it is attached to the tailpipe.

14. The method of claim 12 further comprising the step of rotating the cap 180 degrees from the first position so that a securement member protrudes through an aperture of the cap in order to secure the cap in the second position.

15. The method of claim 12 wherein the plug is a rubber semi-circular shaped member and fills a portion of the interior space of a middle section of the cap that is abuttingly adjacent to the open end of the tailpipe, when the cap is threaded onto the tailpipe.

* * * * *